United States Patent [19]

Gantz et al.

[11] 4,225,814
[45] Sep. 30, 1980

[54] CORDLESS VACUUM CLEANER STORING AND RECHARGING SYSTEM

[75] Inventors: Carroll M. Gantz; Timothy G. Pugh, both of Baltimore; Alvydas P. Karasa, Joppa, all of Md.

[73] Assignee: Black & Decker, Inc., Newark, Del.

[21] Appl. No.: 932,761

[22] Filed: Aug. 11, 1978

[51] Int. Cl.³ .......................................... H01M 10/46
[52] U.S. Cl. ................... 320/2; 15/DIG. 1; 339/119 C
[58] Field of Search ............ 320/2; 15/DIG. 1; 30/DIG. 1; 339/119 C

[56] References Cited

U.S. PATENT DOCUMENTS

| | | |
|---|---|---|
| 3,183,891 | 5/1965 | MacDonald .................. 320/2 UX |
| 3,267,510 | 8/1966 | Cote ............................ 15/DIG. 1 |
| 3,293,528 | 12/1966 | Rosen et al. ...................... 320/2 |
| 3,679,958 | 7/1972 | Chambers ......................... 320/2 |
| 3,710,224 | 1/1973 | Daniels ............................ 320/2 |
| 3,840,795 | 10/1974 | Roszyk et al. ..................... 320/2 |
| 3,973,179 | 8/1976 | Weber et al. ...................... 320/2 |

OTHER PUBLICATIONS

German Printed Application 2620432, 11/77 Engelman.

*Primary Examiner*—Robert J. Hickey
*Attorney, Agent, or Firm*—Finnegan, Henderson, Farabow, Garrett & Dunner

[57] ABSTRACT

A storing and recharging base for a cordless electric vacuum cleaner of the type which includes an elongated housing having an electric motor and fan and rechargeable batteries therein. The base has a flat bottom and key slots so that it can rest on a horizontal flat surface or be hung on a wall. The base has an upper surface contoured generally complementary to the lower surface of the vacuum cleaner housing, and has a pocket at one end which receives a nose portion of the vacuum cleaner, and a spring at the other end which releasably engages in a recess in the vacuum cleaner so that the vacuum cleaner can be stored on a horizontal surface, e.g. on a counter top or shelf, or in a drawer, or can conveniently be hung on a wall. The base also has a plug which electrically engages a receptacle in the vacuum cleaner connected to the batteries. A line cord connects the plug to a charger plug which includes a transformer and a plug for insertion into an A.C. outlet so that the batteries can be continuously recharged when the vacuum cleaner is stored on the base. The base is formed with wireways in which the line cord can be wrapped to vary the length of the line cord extending from the base.

6 Claims, 5 Drawing Figures

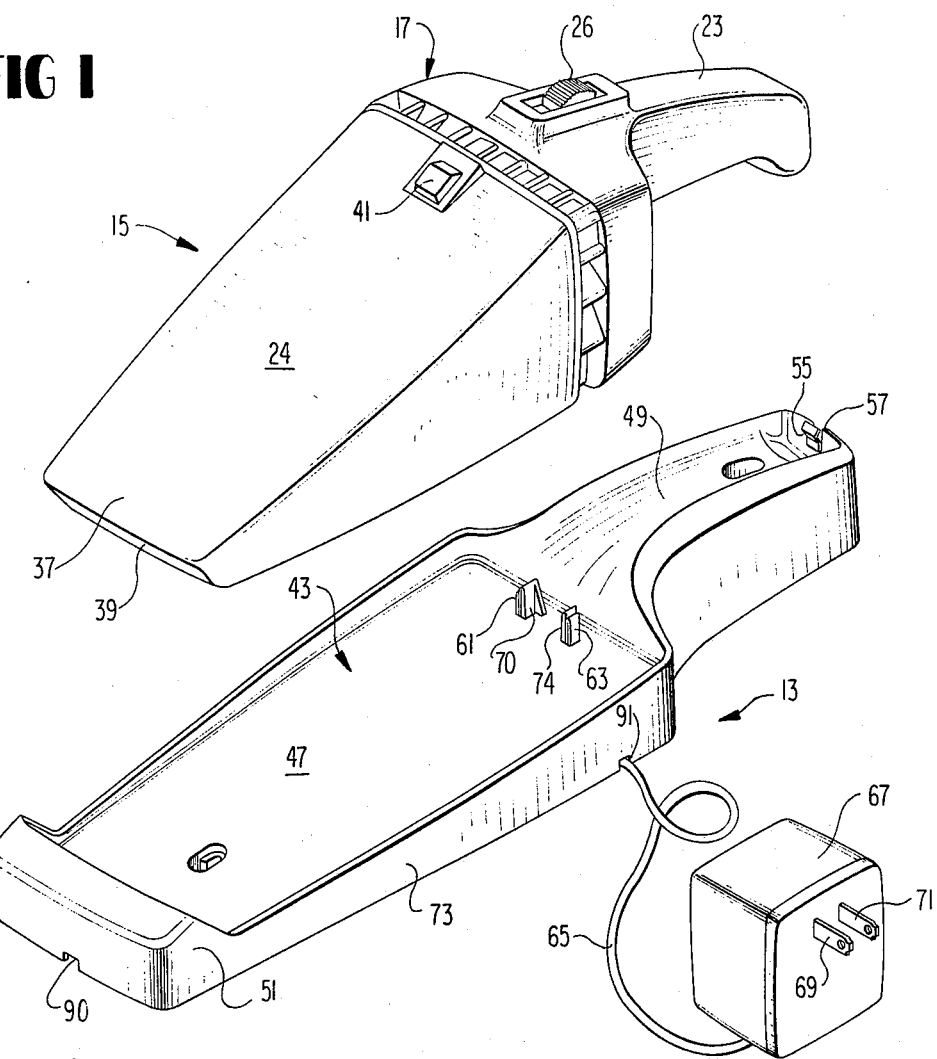
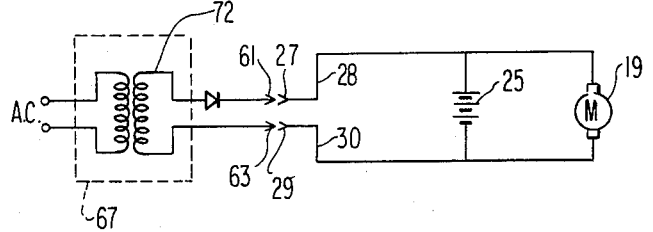
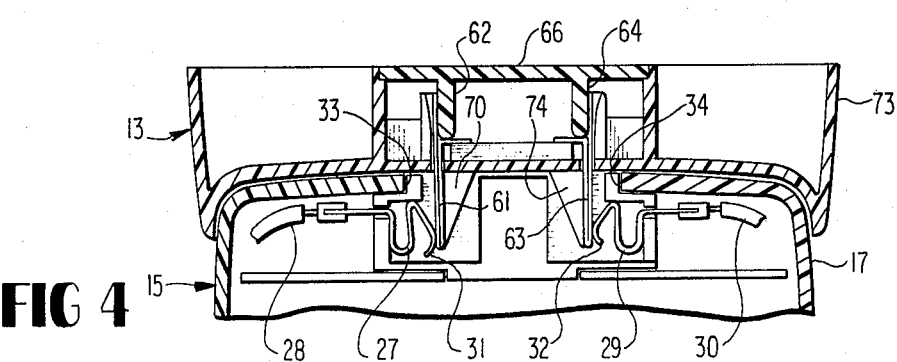

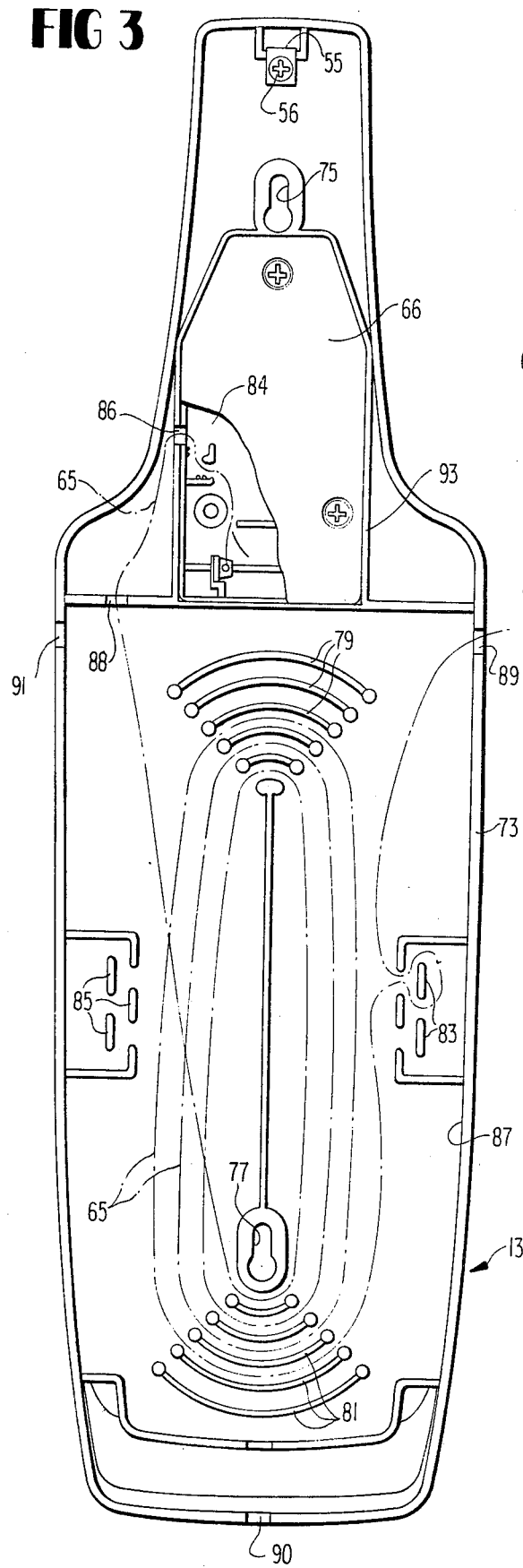
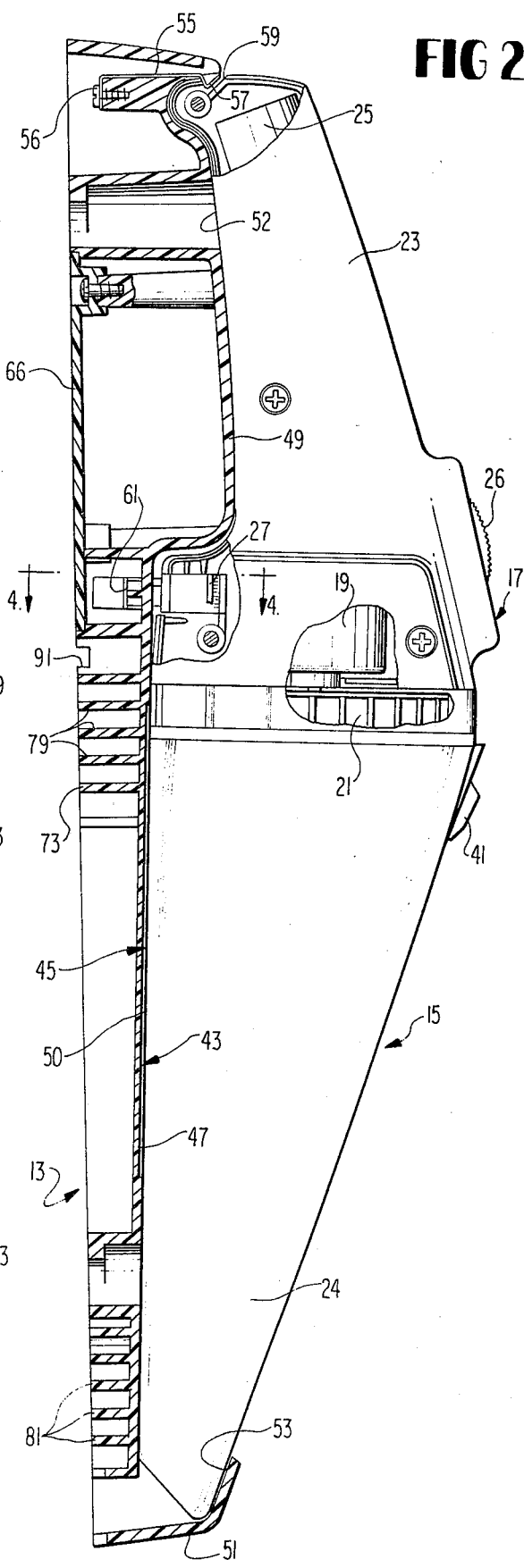

CORDLESS VACUUM CLEANER STORING AND RECHARGING SYSTEM

BACKGROUND OF THE INVENTION

The present invention relates to a storing and recharging system for a cordless electric vacuum cleaner, and more particularly, to a base adapted to store a cordless electric vacuum cleaner either on a horizontal surface, e.g. on a counter top or shelf, or in a drawer, or on a vertical surface, e.g. on a wall, and which allows batteries in the vacuum cleaner to be continuously recharged during storage.

Vacuum cleaners of the type referred to herein are small, hand-held units powered by rechargeable batteries contained therein, and adapted for light-duty cleaning such as may be required on kitchen counter tops, kitchen tables, shelves, stairs, in workshops, and in any hard-to-get-to places. These vacuum cleaners should be capable of being conveniently stored, and should be readily accessible and their batteries charged so that they are always ready for use.

Accordingly, it is desirable that a storage base for a cordless electric vacuum cleaner of the type described be capable of storing the vacuum cleaner on a horizontal surface, e.g. a counter top or in a drawer, or on a vertical surface, e.g. a wall, and that this storage base securely retain the vacuum cleaner thereon but allow it to be quickly and easily removed for use and replaced after use. It is also desirable that while being stored, the rechargeable batteries in the vacuum cleaner be automatically and continuously recharged so that the unit is always ready for use.

Finally, it is desirable that an electric cord extending from the storing and recharging base for connection to a standard A.C. outlet be only as long as necessary to reach from the base to the outlet.

SUMMARY OF THE INVENTION

The present invention satisfies all the requisites set out above by providing a storing and recharging base comprising an elongated base member having a pocket to receive one end of a cordless electric vacuum cleaner and a spring to resiliently engage another part of it. The elongated base member is constructed to rest on a flat surface, such as a counter top, shelf, in a drawer, or the like, and it is also constructed to hang against a vertical surface, such as a wall. In either position, the elongated base member securely holds the vacuum cleaner thereon.

In addition, the elongated base member is formed with an outwardly extending plug which automatically engages in a receptacle in the vacuum cleaner when it is positioned on the base member. The receptacle is electrically connected to rechargeable batteries in the vacuum cleaner, and the plug on the base member may be connected through an electric line cord and transformer to a conventional A.C. outlet. Thus, when the vacuum cleaner is stored on the base, the batteries can be continuously recharged.

The base member has an upper surface in which the vacuum cleaner nests, and is formed with wireways in its bottom in which the line cord can be wrapped so that the length of cord extending from the base member can be the same as the distance from the base member to the A.C. outlet.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, there is provided a storing and recharging base for a cordless electric vacuum cleaner comprising an elongated base member having an upper surface contoured generally complementary to a lower surface of the vacuum cleaner, and a lower surface adapted to rest on or against a flat surface, plug means extending upwardly from the base member and cooperable with electrical receptacle means in the vacuum cleaner connected to rechargeable battery means therein, means on the base member for releasably holding the vacuum cleaner thereon with the plug means and receptacle means engaged, and means including an electric line cord and transformer for connecting the plug means to a standard A.C. outlet.

In another aspect, this invention is a storing and recharging base intended for use with a hand-held cordless electric vacuum cleaner of the type which includes an elongated housing enclosing an electric motor and fan, a handle forming part of the housing and enclosing rechargeable battery means for powering the motor, electrical receptacle means positioned inwardly of the bottom of the housing and electrically connected to the battery means, the housing including an elongated hollow bowl having a forward nose portion provided with an inlet opening communicated with the fan and adapted to receive and entrap dirt drawn inwardly through the opening; the base comprising an elongated base member having a flat bottom adapted to rest on or against a flat surface, and an upper surface shaped to support a bottom surface of the vacuum cleaner, the elongated base member being formed with pocket means adapted to receive the forward nose portion of the vacuum cleaner bowl and having resilient means remote from the pocket means engageable with another portion of the vacuum cleaner to releasably hold the nose portion in the pocket means and retain the vacuum cleaner on the elongated base member, whereby the elongated base member may be supported on or against a variety of flat surfaces, including both horizontal and vertical surfaces, and the vacuum cleaner is securely and releasably retained thereon and readily removable therefrom, the elongated base member further having plug means extending outwardly of its upper surface and engageable with the receptacle means in the vacuum cleaner when it is in position on the elongated base member, means including a line cord and a transformer adapted to connect the plug means to a standard A.C. source, whereby the battery means can be continuously recharged during storage of the vacuum cleaner.

In yet another aspect, this invention includes a storing and recharging device for a hand-held cordless electric vacuum cleaner and comprises an elongated base adapted to rest on or against a flat surface and has an upper surface contoured to nestingly receive and support the vacuum cleaner, the base having an upstanding member forming a pocket adapted to receive a portion of the vacuum cleaner, and resilient means adapted to engage another portion of the vacuum cleaner to releasably retain the vacuum cleaner thereon, the base having plug means extending outwardly of its upper surface, an electric line cord connected at one end to the plug means and having a plug at the other end adapted to connect the cord to a standard A.C. outlet, the base having wireway means formed in its bottom in which selected lengths of the line cord can be positioned, whereby the length of the line cord extending from the base may be varied.

The accompanying drawings which are incorporated in and constitute a part of this specification illustrate one embodiment of the invention, and together with the description, serve to explain the principles of the invention.

BRIEF DESCRIPTION OF THE DRAWINGS

FIG. 1 is a perspective view of a storing and recharging device which embodies and is constructed in accordance with the present invention and is shown positioned on a horizontal surface, and showing a cordless hand-held, electric vacuum cleaner adapted to be used therewith;

FIG. 2 is a view showing the storing and recharging device of FIG. 1 in section and as hung on a vertical surface, and with the vacuum cleaner in position thereon;

FIG. 3 is a bottom plan view of FIG. 2 with parts broken away for clarity;

FIG. 4 is a sectional view of FIG. 2 taken along the line 4—4 thereof; and

FIG. 5 is a schematic illustration of an electrical circuit for recharging the battery means of the vacuum cleaner when stored on the device of the invention.

DESCRIPTION OF THE PREFERRED EMBODIMENT

Reference will now be made in detail to the present preferred embodiment of the invention, an example of which is illustrated in the accompanying drawings. In the description that follows, it will be understood that when referring to the "upper surface" of the storing and recharging base is meant the surface on which the vacuum cleaner rests, and that the "lower surface" is the surface opposite the upper surface.

The preferred embodiment of the storing and recharging device constructed according to the present invention is shown in FIGS. 1 and 2 and is seen to include an elongated base member 13 which is intended for use with a cordless electric vacuum cleaner 15 also shown in FIGS. 1 and 2. The vacuum cleaner 15 includes an elongated housing 17 formed with a handle 23 at one end and has a hollow bowl 24 detachably fixed to its other end. A motor 19 and fan 21 are positioned in the housing 17 between the handle 23 and bowl 24, and rechargeable batteries 25 for powering the motor 19 are positioned in the handle 23. Switch means for controlling the motor 19 includes a switch operator 26 on the housing 17 adjacent handle 23.

The vacuum cleaner 15 is provided with electrical receptacle means positioned inwardly of the bottom of its housing 17. The electrical receptacle means includes a pair of conductive spring contacts 27,29 (FIG. 4) which are mounted inwardly of the housing 15 and are electrically connected by conductors 28,30 to the rechargeable batteries 25. Spring contacts 27,29 have free ends 31,32 which are aligned with openings 33,34 formed in housing 17.

The vacuum cleaner bowl 24 has a forward nose portion 37 which is provided with an air inlet opening 39 communicated with the fan 21. Filter means (not shown) is positioned inside the bowl, and a flapper valve (not shown) normally closes the opening 39 but opens under suction created by the rotating fan, so that when the motor 19 is on and the fan 21 rotating, the bowl 24 receives and entraps dirt drawn inwardly through the air inlet opening 39. To empty the dirt, the bowl is detached from housing 17 by means of a release button 41.

In accordance with the invention, the storing and recharging base 13 is constructed to support and releasably retain the vacuum cleaner 15 thereon. As here embodied, the base 13 is constructed of suitable impact resistant material, such as high impact polystyrene or ABS which is electrically insulating and capable of being molded. The base 13 has an upper surface 43 which is concave and contoured generally complementary to the lower surface of the vacuum cleaner. The base surface 43 includes a forward portion and an upwardly stepped and relatively narrow rearward supporting portion 49. The vacuum cleaner bowl 24 has a lower surface 50 which nests in base surface 47, and the handle 23 has a lower surface 52 which nests in base surface 49.

At its forward end, the base 13 has an integral upstanding member 51 which is hollow and forms a pocket 53. The forward nose portion 37 of the vacuum cleaner 15 fits snugly into the pocket 53. The base 13 is also provided with resilient means remote from the pocket 53 to releasably engage the vacuum cleaner 15. As here embodied, a spring arm 55 is fixed to the base 13 by a screw 56 and has free end formed with a bent portion 57 which, when the vacuum cleaner 15 is in place on the base 13, engages in a recess 59 at the rearward end of the vacuum cleaner handle 23.

In accordance with the invention, the storing and recharging base 13 is provided with means which, when the vacuum cleaner 15 is in place and stored thereon, facilitates automatic recharging of the vacuum cleaner batteries 25. As embodied herein, the base 13 has plug means formed by a pair of male terminals 61,63 which extend outwardly of the base surface portion 47. The plug terminals 61,63 are held in place by ribs 62,64 carried by a removable cover 66 fixed to the bottom of base 13. The terminals 61,63 are positioned so that when the vacuum cleaner 15 is in place on the base 13, as shown in FIG. 2, the terminals 61,63 extend into the openings 33,34 in the vacuum cleaner housing 17 and engage the free ends 31,32 of spring contacts 27,29, respectively. The plug terminals 61,63 are connected to conductors carried in a line cord 65 which in turn is connected to a charger plug 67 provided with plug terminals 69,71. A stepdown transformer illustrated schematically at 72 in FIG. 5 is in the charger plug 67. The plug terminals 69,71 are adapted to plug into a standard A.C. outlet, and the transformer 72 provides the desired low voltage at the plug terminals 61,63 on the base member 13. Insulating ribs 70,74 are provided adjacent and between plug terminals 61,63 and serve to guide the plug terminals 61,63 into contact with the spring contact free ends 31,32.

When the vacuum cleaner 15 is not in use, it is adapted for ready storage on the base 13 and automatic recharging of its batteries 25. The user simply inserts the nose portion 37 of the vacuum cleaner bowl 24 into the pocket 53 on base 13 and then tilts the vacuum cleaner handle 23 toward the supporting surface 49. The ribs 70,74 and terminals 61,63 enter openings 33,34 and guide the terminals 61,63 into engagement with the contact free ends 31,32 and the vacuum cleaner 15 into proper position on the base 13. The free end bent portion 57 of spring arm 55 snaps into engagement with the handle recess 59 and, at the same time, plug terminals 61,63 engage spring contacts 27,29. With the terminals 69,71 on charger plug 67 plugged into a standard A.C. outlet, the batteries 25 are continuously recharged. When it is again desired to use the vacuum cleaner 15, the user simply grasps the handle 23 and pulls it away from the base surface 49. The spring arm 55 releases from the recess 59 and the plug terminals 61,63 release from the spring terminal arms 27,29. The user then slides the nose portion 37 out of the pocket 53 and the vacuum cleaner 15 is ready for use.

In accordance with the invention, the storing and recharging base 13 is adapted to rest on a flat, horizontal surface such as a counter top, shelf, or the like, and it is also adapted to be hung on a generally vertical surface, such as a wall. As here embodied, the base 13 has a generally flat lower surface formed by a skirt 73, and is provided with a pair of key slots 75,77. When the base is to be wall hung, suitable screws are mounted on the wall and fitted into the key slots 75,77.

In accordance with the invention, means is provided on the base 13 to vary the length of the electric cord 65 which extends from the base. It is desirable that only the necessary length of electric cord 65 extend from the base so as to allow the charger plug 67 to reach a convenient standard A.C. outlet. As embodied herein, the underside of base 13 (FIG. 3) is formed with a plurality of spaced arcuate ribs 79,81 formed integral therewith and which form arcuate recesses in a cavity 87 within the skirt 73. Further, the underside of base 13 may be formed with a plurality of spaced posts 83,85 laterally of the arcuate segments 79,81. Conveniently, the surfaces of ribs 79,81, posts 83,85, the members forming the key slots 75,77, and all other parts at the lower surface of the base 13 are all coplanar with the surface of skirt 73.

The line cord 65 passes from a cavity 84 defined by a skirt 93 through apertures 86,88, and into the cavity 87. The cord 65 is then selectively wound around one or more of the arcuate ribs 79,81 and may also be wound around selective ones of the posts 83,85, and ultimately emerges through one of three slots 89,90,91 formed in the skirt 73. By selecting the number of ribs 79,81 and posts 83,85 that the cord 65 is wrapped around, and the proper opening 89,90,91 through which the cord 65 emerges, only the necessary minimum length of cord extends from the base 13 to the nearest A.C. outlet. Thus, an excessive cord length is not left dangling between the base 13 and the A.C. outlet.

It will be apparent to those skilled in the art that various editions, substitutions, modifications, and omissions can be made to the present invention without departing from the scope or spirit of the invention. Thus, it is intended that the present invention covers such provided that they come within the scope of the appended claims and their equivalents.

What is claimed is:

1. A storing and recharging device for hand-held cordless electric vacuum cleaner comprising an elongated base adapted to rest on or against a flat surface and having an upper surface contoured to receive and support said vacuum cleaner, said base having means cooperatively engageable with said vacuum cleaner to releasably retain said vacuum cleaner thereon, said base having plug means extending outwardly of its upper surface, said plug means including a pair of generally parallel, spaced plug terminals, insulating means extending outwardly of said base upper surface and between said terminals, said insulating means extending outwardly beyond said terminals, an electric line cord connected at one end to said plug means and extending outwardly of the bottom of said base and adapted to connect to a standard A.C. outlet.

2. A storing and recharging base for use with a hand-held cordless electric vacuum cleaner of the type which include an elongated housing and closing an electric motor and fan, a handle forming part of said housing and enclosing rechargeable battery means for powering said motor, electrical receptacle means positioned inwardly of the bottom of said housing and including a pair of spaced spring contacts electrically connected to said battery means, said housing including an elongated hollow bowl having a forward nose portion provided with an inlet opening communicated with said fan and adapted to receive and entrap dirt drawn inwardly through said opening; said base comprising an elongated base member having a flat bottom adapted to rest against a flat surface, and an upper surface shaped to support a bottom surface of said vacuum cleaner, said elongated base member including means to releasably retain said vacuum cleaner on said elongated base member, said elongated base member further having plug means including a pair of spaced plug terminals extending outwardly of its upper surface and an engageable with said spring contacts in said vacuum cleaner when it is in a position on said elongated base member, insulating ribs extending outwardly of said upper surface between and adjacent said plug terminals, said ribs engaging and extending outwardly beyond said terminals.

3. A storing and recharging device for a hand-held cordless electric vacuum cleaner comprising an elongated base adapted to rest on or against a flat surface and having an upper surface contoured to receive and support said vacuum cleaner, said base having an upstanding member forming a pocket adapted to receive a portion of said vacuum cleaner, and resilient means adapted to engage another portion of said vacuum cleaner to releasably retain said vacuum cleaner thereon, said base having plug means extending outwardly of its upper surface, an electric line cord connected at one end to said plug means and extending outwardly of the bottom of said base, a plug at the other end of said cord adapted to connect said cord to a standard A.C. outlet, said base having wireway means formed in its bottom in which selected lengths of said line cord can be positioned, said wireway means including a plurality of spaced ribs forming recesses in the bottom of said base, said line cord adapted to fit in said recesses, whereby the length of the line cord extending from said base may be varied.

4. The invention claimed in claim 3, said base having a peripheral skirt around its bottom which defines a cavity in said bottom in which said wireway means is enclosed, said skirt having a plurality of slots spaced there around for selective exiting of said line cord.

5. The invention claimed in claim 4 said ribs including sets of ribs disposed at longitudinally spaced locations of said base, said wireway means also including a plurality of spaced posts within said cavity and disposed laterally of said ribs, said line cord adapted to fit between said posts.

6. The invention claimed in claim 5, said skirt, ribs, and posts having outer surfaces which are substantially coplanar.

* * * * *